W. B. SNEDAKER.

Car Coupling.

No. 4,339. Reissued April 11, 1871.

Witnesses.

C. D. Van Allen

E. Williams

Inventor.

W. B. Snedaker per F. A. Morley

Atty.

N. PETERS, Photo-Lithographer, Washington, D. C.

United States Patent Office.

WARREN B. SNEDAKER, OF PHŒNIX, NEW YORK.

Letters Patent No. 108,404, dated October 18, 1870; reissue No. 4,339, dated April 11, 1871.

IMPROVEMENT IN CAR-COUPLINGS.

The Schedule referred to in these Letters Patent and making part of the same.

*To all whom it may concern:*

Be it known that I, WARREN B. SNEDAKER, of Phœnix, in the county of Oswego and State of New York, have invented a new and improved Car-Coupling; and I do hereby declare that the following is a full, clear, and exact description thereof, which will enable others skilled in the art to make and use the same, reference being had to the accompanying drawing forming part of this specification, in which—

Similar letters of reference indicate like parts in the several figures.

Figure 1:
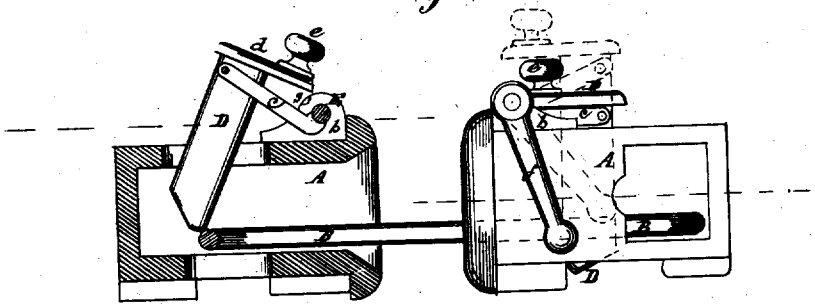
Figure 1 represents a side view, partly in section, of my improved car-coupling.
Figure 2:
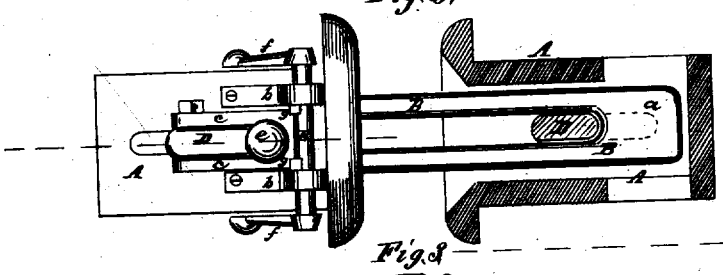
Figure 2 is a plan or top view, partly in section, of the same.
Figure 3:
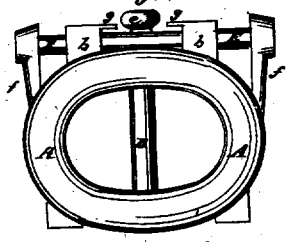
Figure 3 is an end view of the same.
Figure 4:
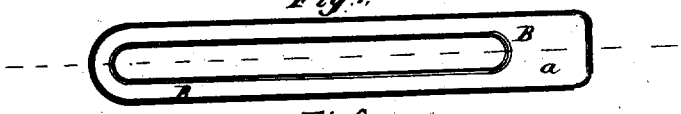
Figure 4 is a plan view of the link.
Figure 5:
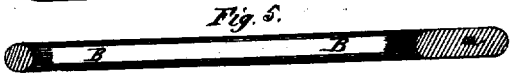
Figure 5 is a longitudinal section of the link.

This invention is an improvement in the class of car-couplings which is known as "self-coupling;" and The improvement consists in the peculiar construction and arrangement of the devices constituting the coupling, whereby they are adapted to operate as hereinafter set forth.

A A in the drawing represent the draw-heads of two cars.

B is the coupling-link.

In ears *b b* that project from each draw-head is hung a transverse shaft, E, which has projecting cranks *c c*, to the ends of which the pin D is pivoted.

The pin D fits through a slot of the draw-head, and is supported on the cranks *c* by means of a projecting flange, *d*.

It is also provided with a projecting knob, *e*, to facilitate handling.

The shaft E has, furthermore, two projecting arms *f f*, which are weighted at the ends to hold the pins down, when, by raising the knob *e* or swinging the shaft E, the pin D is raised, it is drawn forward, and will thus clear the link without requiring the cars to be pushed together.

When the car is uncoupled the pin will hang the same as when coupled, but will yield to the inserted link to permit automatic coupling, the weighted arms drawing it down again immediately after it is clear at the lower end.

The ears *b* have stops *g*, which arrest the cranks *c*, preventing the raising of the pin beyond the necessary height.

The link B has one end loaded by an additional amount of metal, *a*, so that the link will balance inward over the edge of the draw-head, and its outer end be held up to the horizontal, ready for coupling without care or attention.

Having thus described my invention,

What I claim, and desire to secure by Letters Patent, is—

The coupling-pin D provided with flange *d*, the shaft E, crank-arms *c*, weighted arms *f f*, and the link B with loaded end *a*, combined with the slotted draw-head A, provided with stops *g*, all constructed and arranged in the manner shown and described.

The above specification of my invention signed by me this 25th day of February, 1871.

W. B. SNEDAKER.

Witnesses:

CLARK ROOT,

F. A. MORLEY.